United States Patent
Riley et al.

(10) Patent No.: US 9,750,341 B2
(45) Date of Patent: *Sep. 5, 2017

(54) MODULAR TECHNOLOGY FURNITURE

(71) Applicant: Nati Brook Ventures, LLC, Beltsville, MD (US)

(72) Inventors: Darren Patrick Riley, Beltsville, MD (US); Christopher Dykes, Columbia, MD (US)

(73) Assignee: NATI BROOK VENTURES, LLC, Beltsville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,026

(22) Filed: Mar. 15, 2016

(65) Prior Publication Data

US 2016/0227923 A1 Aug. 11, 2016

Related U.S. Application Data

(63) Continuation of application No. 14/618,492, filed on Feb. 10, 2015, now Pat. No. 9,282,814.

(51) Int. Cl.
*A47B 21/00* (2006.01)
*H05K 5/00* (2006.01)
(Continued)

(52) U.S. Cl.
CPC .......... *A47B 21/04* (2013.01); *A47B 21/0073* (2013.01); *A47B 83/02* (2013.01);
(Continued)

(58) Field of Classification Search
CPC ..... A47B 21/04; A47B 21/0073; A47B 83/02; G06F 1/1601
See application file for complete search history.

(56) References Cited

U.S. PATENT DOCUMENTS 5,452,950 A * 9/1995 Crenshaw ............ A47B 39/00
248/918
6,059,385 A * 5/2000 Guhl ..................... A47B 21/00
312/196

(Continued)

FOREIGN PATENT DOCUMENTS

DE     10252537 A1 * 5/2004  ............ A47B 21/00
KR  20080037641 A  * 4/2008
KR  20080081587 A  * 9/2008  ............ A47B 21/00

*Primary Examiner* — Nathan Milakovich
(74) *Attorney, Agent, or Firm* — Moazzam & Associates, LLC

(57) ABSTRACT

Systems are disclosed that relate to modular furniture capable of providing conventional desk functions as well as integrated electronic components which house, store, and operate electronic devices, such as computers and associated devices. Furniture components of a traditional office are adapted to house a plurality of electronic components of a traditional computer system. Connectors, expansion slots, networking capabilities, and other storage units are provided within the furniture components enabling several electronic devices to be installed within the furniture components and communicate with each other, integrating a fully functional computer system into a classroom or office desk. The disclosed modular furniture systems provide multiple resources and functions in a small footprint and are useable in a variety of school, personal and work settings.

20 Claims, 9 Drawing Sheets

(51) Int. Cl.
*H05K 7/00* (2006.01)
*G06F 1/16* (2006.01)
*A47B 21/04* (2006.01)
*A47B 21/007* (2006.01)
*G06F 1/18* (2006.01)
*A47C 7/72* (2006.01)
*A47B 83/02* (2006.01)

(52) U.S. Cl.
CPC ............... *A47C 7/72* (2013.01); *G06F 1/1601* (2013.01); *G06F 1/18* (2013.01); *G06F 1/182* (2013.01); *A47B 2083/025* (2013.01); *A47B 2200/0072* (2013.01); *A47B 2200/0073* (2013.01)

(56) References Cited

U.S. PATENT DOCUMENTS

| | | | | |
|---|---|---|---|---|
| 6,237,507 B1 * | 5/2001 | Yanagisawa | ....... | A47B 21/0073 108/3 |
| 6,286,440 B1 * | 9/2001 | Jyringi | ....... | A47B 21/00 108/50.01 |
| 6,553,919 B1 * | 4/2003 | Nevin | ....... | A47B 21/0073 108/25 |
| 7,029,079 B2 * | 4/2006 | Holt | ....... | A47B 21/00 108/50.01 |
| 7,047,890 B2 * | 5/2006 | Korber | ....... | A47B 21/0073 108/50.01 |
| 7,100,516 B2 * | 9/2006 | Riddiford | ....... | A47B 21/00 108/50.01 |
| D652,229 S * | 1/2012 | Madison | ....... | D6/655 |
| 2003/0197451 A1 * | 10/2003 | Michael | ....... | A47B 21/0073 312/316 |
| 2006/0191445 A1 * | 8/2006 | Stengel | ....... | A47B 21/0073 108/50.01 |
| 2006/0226742 A1 * | 10/2006 | Gevaert | ....... | A47B 21/0073 312/7.2 |
| 2008/0116771 A1 * | 5/2008 | Green | ....... | A47B 81/06 312/7.2 |
| 2009/0039743 A1 * | 2/2009 | Gevaert | ....... | A47B 21/0073 312/223.2 |
| 2010/0096960 A1 * | 4/2010 | Lee | ....... | A47B 21/00 312/194 |

* cited by examiner

MODULAR TECHNOLOGY FURNITURE

This application is a continuation of U.S. patent application Ser. No. 14/618,492, filed Feb. 10, 2015, now U.S. Pat. No. 9,282,814; which is a continuation of U.S. patent application Ser. No. 14/301,111, filed Jun. 10, 2014, now U.S. Pat. No. 8,953,308; which is a continuation of U.S. patent application Ser. No. 12/882,114, filed Sep. 14, 2010, now U.S. Pat. No. 8,749,959; which claims priority to U.S. Provisional Patent Application Ser. No. 61/246,696, filed Sep. 29, 2009; the contents of which are hereby incorporated by reference herein in their entirety into this disclosure.

BACKGROUND OF THE INVENTION

Field of the Invention

The present invention relates to furniture. More specifically, the present invention relates to modular furniture combined with electronic components.

Background of the Invention

Computer technology is a useful set of tools that enables a user to perform a number of simple to complex tasks, ranging from everyday scheduling and communication to long-term and complex project development and design. However ubiquitous computers are, they have yet to make their way into the educational system as they have in mainstream society; particularly in classrooms ranging from elementary school to high school. Typically, computers are deployed into the classroom setting as single or multiple work stations, as a separate class subject matter, or as laptops carted from class to class. Full deployment has yet to take place where every student has a computer and incorporates the use of the computer into daily class lessons and activities. This is because the addition of computers requires additional space or arrangements to the existing furniture or classrooms, and thus is not easily accessible to students. Teachers and students often must make separate arrangements utilizing valuable instructional time to set up computers for use.

Some have developed a basic version of a laptop computer designed for use in classroom settings with extremely tight budgets, for instance, in third world countries. A popular version of one of these programs is the "one laptop per child" (OLPC) initiative, or the $35 laptop recently unveiled in India. As noble and ambitious as these ventures are, they are still short-sighted in their approach. They neglect one of the core lessons of computer technology, that laptop computers are minimally upgradable. As computer technology evolves at increasingly faster rates, laptops are disposed of while only desktop computers having separate components and room for expansion manage to stay somewhat current. A desktop computer is, in a sense, modular, as a user can upgrade a central processing unit (CPU) without having to replace other components such as motherboard, display, etc. However, even deploying desktop computers subjects educators to the myriad of struggles described above.

What is needed is a modular furniture system having electronic components that conforms to the needs of the modern classroom, home or business office. It should be easy to use and manufacture, and have a small footprint to enable proper placement in rooms or locations of any size.

SUMMARY OF THE INVENTION

The present invention includes systems and methods for integrating a fully functional computer system into any classroom or office desk allowing the computer to become an easily accessible tool for the teachers, students, and office staff. Furniture components of a traditional office are adapted to house a plurality of electronic components of a traditional computer system. The components are coupled together to form a modular furniture system, wherein access to the electronic components is intuitive and comfortable for a user, while being upgradeable and scalable for different uses and needs. Motherboards, output devices, and input devices are strategically housed within desks, chairs, etc., so that simply by flipping up a computer screen from a top surface of a desk, and pulling out a keyboard, a computer is ready to be used. When coupled with networking software and programming, the ways in which the present invention will enhance a user's experience are virtually limitless.

In one exemplary embodiment, the present invention is a modular furniture system including a shell having a substantially planar upper surface and one or more housing adapted to store a plurality of electronic components, a motherboard placed within a motherboard housing of the shell, the motherboard including at least a central processing unit (CPU) and a memory, a display device placed within a display housing of the shell and having a pivot point at a bottom of the display device, such that a back surface of the display device becomes part of the upper surface of the shell when the display device is in a closed position, an input device placed within an input device housing of the shell, a plurality of computer buses integrated within the shell to transmit data to and from the plurality of electronic components, and a power system integrated within the shell to power the plurality of electrical components from a single power source.

In another exemplary embodiment, the present invention is a modular furniture system including a desk portion with a substantially planar upper surface, a housing portion adapted to store a plurality of electronic components, a display device placed within a display housing of the desk portion and having a pivot point at a bottom of the display device, such that a back surface of the display device becomes part of the upper surface of the desk portion when the display device is in a closed position, a motherboard enclosed within the display device, the motherboard including at least a central processing unit (CPU) and a memory, an input device placed within an input device housing of the desk portion, a plurality of computer buses integrated within one or more of the desk portion and the housing portion to transmit data to and from the plurality of electronic components, and a power system integrated within one or more of the desk portion and the housing portion to power the plurality of electrical components from a single power source.

In yet another exemplary embodiment, the present invention is a modular furniture system including a chair portion including a seat portion and a back portion, a computer housing coupled to a bottom surface of the seat portion, a table portion coupled to the chair portion, the table portion having a substantially planar upper surface and one or more housing adapted to store a plurality of electronic components, a display device placed within a display housing of the table portion, an input device placed within an input device housing of the table portion, and a motherboard placed within the computer housing of the chair portion, the motherboard including at least a central processing unit (CPU) and a memory.

DETAILED DESCRIPTION OF THE INVENTION

Figure 1A:
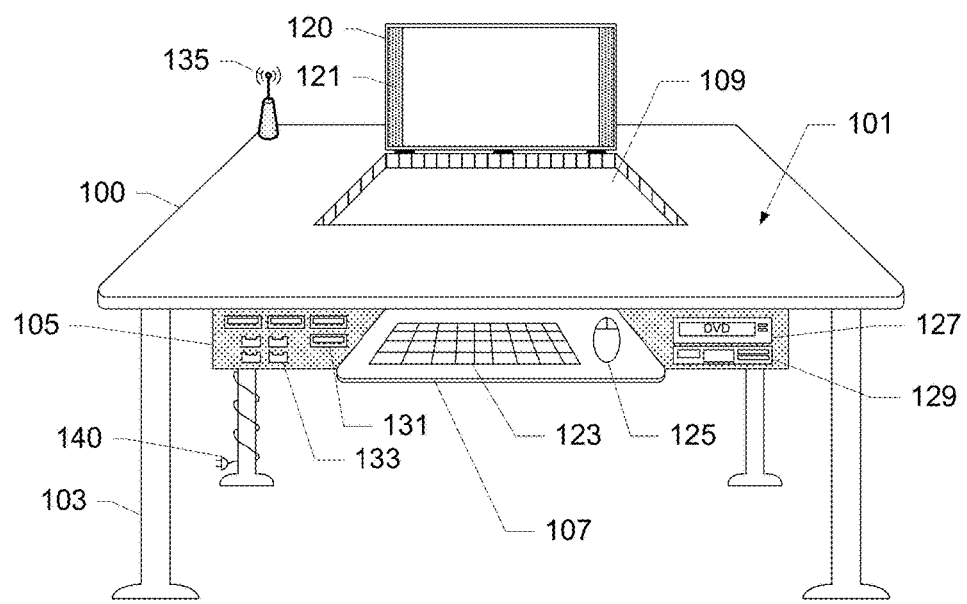
FIGS. 1A-1B show a modular furniture system, according to an exemplary embodiment of the present invention.

The present invention includes low profile, highly modular furniture systems for use in classrooms or office settings. Furniture components of a traditional office are adapted to house a plurality of electronic components of a traditional computer system. The components are coupled to together to form a modular furniture system. Connectors, expansion slots, networking capabilities, and other storage units are provided within the furniture components enabling several electronic devices to be installed within the furniture components and communicate with each other. The present invention thus integrates a fully functional computer system into a classroom or office desk, allowing the computer to become an easily accessible tool for the teachers, students or office staff.

The usefulness of the present invention is not limited to the classroom setting. There is applicability for the present invention design concept in other settings such as offices, colleges, universities, and laboratories. Integrating computer systems into everyday work spaces allows computers to become a tool as regularly used as a pen or ruler.

As used herein and throughout this disclosure, a computer system, computer, or microcomputer includes any combination of a central processing unit (CPU), a memory, input/output (I/O) interfaces and devices, and logic in the form of instructions. Examples of CPUs are computer processors (processing units), microprocessors, digital signal processors, controllers and microcontrollers, etc. The memory stores applications, software, or logic. Examples of memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. Computers may communicate with each other and with other elements via a network, for instance, a wireless network, or a wireline network.

A "network" includes broadband wide-area networks such as cellular networks, local-area networks (LAN), wireless LAN (Wi-Fi), near-field communication (NFC) networks, etc. Communication is enabled by hardware elements called "transceivers," for instance, a Wi-Fi transceiver for communicating with a Wi-Fi network, and a BLUETOOTH® transceiver for communicating with a BLUETOOTH® device.

A modular furniture system is a combination of furniture items adapted to be coupled with a combination of electronic devices in specific configurations. Examples of furniture items include but are not limited to surfaces, legs and other supporting members, shelves, chairs, wheels, and other components commonly used in offices and classrooms today. Examples of electronic devices include but are not limited to computers, communication devices, input and output devices, peripherals, adapters, wiring, and other components necessary to operate a computer system or network. The system is modular as it can be adapted to fit different needs. For instance, electronic devices coupled to a classroom chair/desk combination apparatus form a modular furniture system. Alternatively, systems according to the present invention may be pre-manufactured to be modular and incorporate the computer systems and electronics as shown and described herein in this disclosure. Both types, and their hybrids, are within the scope of the present invention.

For the following description, it can be assumed that most correspondingly labeled structures across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1B:
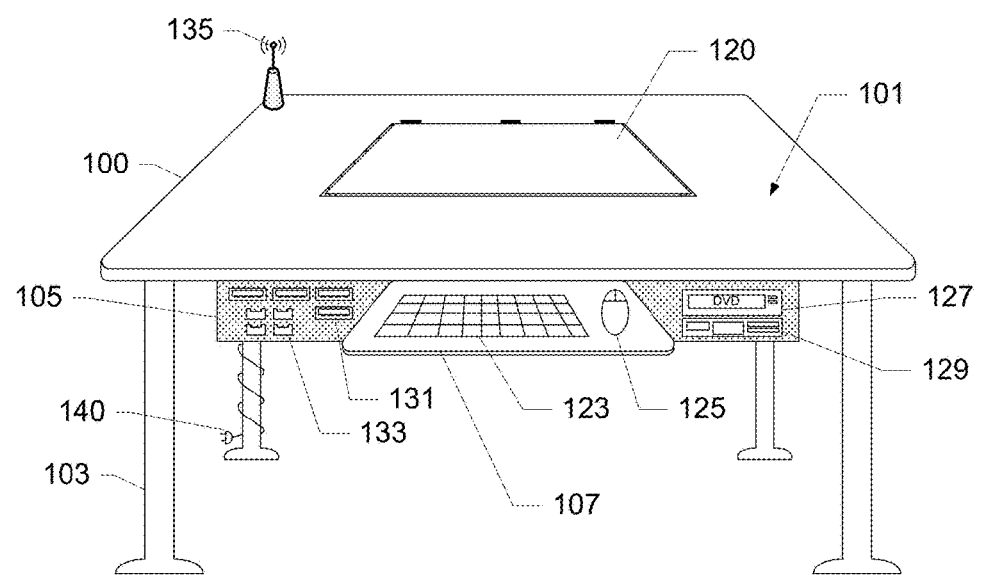

FIGS. 1A and 1B show a modular furniture system, according to an exemplary embodiment of the present invention. Referring to FIG. 1A, the system includes a desk portion 100 having a top surface 101, and being coupled to a plurality of legs 103. Legs 103 are positioned so that top surface 101 is substantially planar and relatively flat, and in parallel to a floor. Coupled to desk portion 100 is a storage portion 105, which includes a plurality of housings for electronic devices as well as room for drawers and other storage components. Together, desk portion 100 and storage portion 105 form a shell adapted to house a plurality of electronic components. A display housing 109 is located within top surface 101 of desk portion 100. Display 120 is coupled to desk portion 100 via pivot points, thereby being adapted to be housed within display housing 109 when in a lowered state. As seen in FIG. 1B, a back surface of screen 120 lies flush with top surface 101 when display 120 is in a lowered state. Referring back to FIG. 1A, speakers 121 are coupled to or housed within display 120. However, they can be positioned elsewhere.

A retractable shelf 107 supports and houses input devices such as a keyboard 123 and a mouse 125. Among the plurality of housings within storage portion 105 are housings for a media drive 127 and memory card readers 129. Storage portion 105 also includes housings for ports such as USB ports 131 and FireWire ports 133. An antenna 135 is coupled to an access point or other wireless transceiver enabling wireless communication with other devices and networks.

Desk portion 100 is made of any natural or synthetic material that is firm enough to tolerate the forces typical during regular use, including the weight of display 120 and storage portion 105. Additional supporting members/features may be included to support these forces. For instance, leg portions 103 may include cross bars connecting each other to form a more stable supporting frame for desk portion 100 and storage portion 105. Storage portion 105 may be a shell that is hollow on the inside allowing for easy installation and removal of a plurality of electronic components, and other computer components. For instance, electronic components such as display 120, keyboard 123, media drive 127, etc., are in communication with each other and with a central processing unit via a plurality of connectors or wires forming a computer bus (not shown). The computer bus carries signals and data including many different formats and protocols to and from the electronic components. Display 120 can be any type of display such as an LCD screen, OLED, touch-screen, etc. Media drive 127 includes disc drives such as DVD, CD, HD-DVD, etc. Memory card readers 129 include slots for secure digital (SD), and other proprietary and open source memory card types and formats. Plug 140, via a power cable, provides power to the electronic components via a power system.

Figure 2:
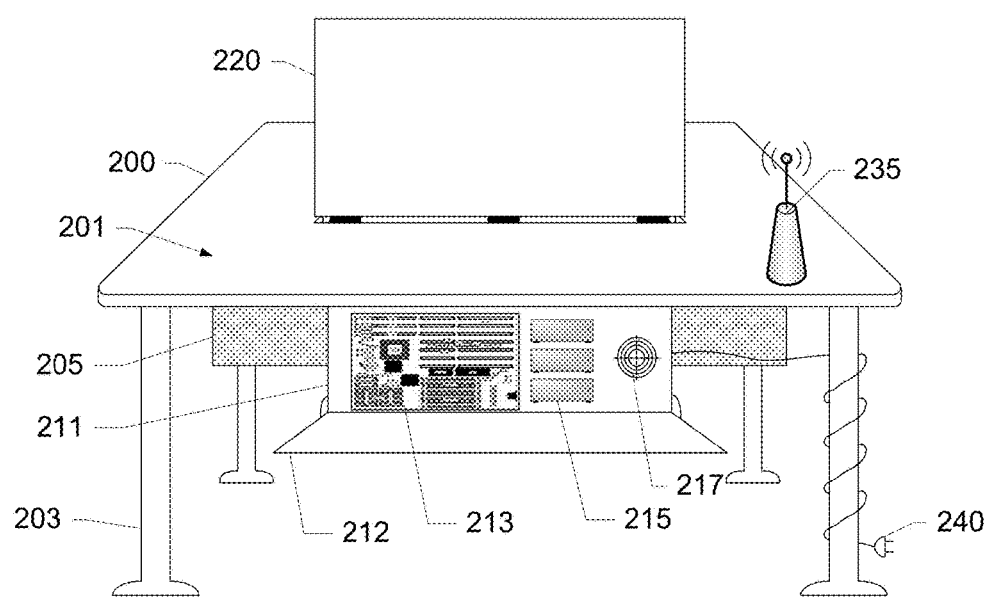
FIG. 2 shows a back view of a modular furniture system, according to an exemplary embodiment of the present invention.

FIG. 2 shows a back view of a modular furniture system, according to an exemplary embodiment of the present invention. Similar to FIG. 1A, the system includes a desk portion 200 having a top surface 201, legs 203, and storage portion 205. Additionally coupled to either or both of storage portion 205 and desk portion 200 is a housing 211 that encloses motherboard 213, storage units 215, and power supply 217. Motherboard 213 includes at least a CPU and a memory bank including a plurality of memory units. The memory units include operating memory for the CPU, as well as logic and programs such as a basic input/output system (BIOS), operating system, etc. Motherboard 213 further includes expansion slots, and potentially other components such as video processors, transceivers, and other microprocessors. Storage units 215 include hard disk drives (HDD), solid state drives (SSD), etc., arranged in one of several configurations such as RAID, and communicate with motherboard 213 via one of a computer bus that includes several transport mechanisms such as SCSI, SATA, etc. Further, the other storage components of the system of FIG. 1A such as media drives 127 and 129 may communicate with motherboard 213 via an ATAPI, USB, SATA, or other interface. A USB controller can be integrated within motherboard 213 and provide USB connectivity to devices such as a keyboard, mouse, speakers, USB ports, etc. Alternatively, such devices can communicate via a transceiver 235, wherein transceiver 235 is a radio transceiver in communication with a network interface on motherboard 213. For instance, transceiver 235 can be a BLUETOOTH (or equivalent) transceiver. Power supply 217 includes a transformer or adapter to receive power from an electrical outlet via plug 240, and transform the voltage and current for use by the electronic components of the system. Power supply 217 may include a battery and/or an uninterruptable power supply (UPS). Panel 212 acts as a cover for housing 211, providing quick access to upgrade motherboard 213, storage units 215, etc.

Figure 3:
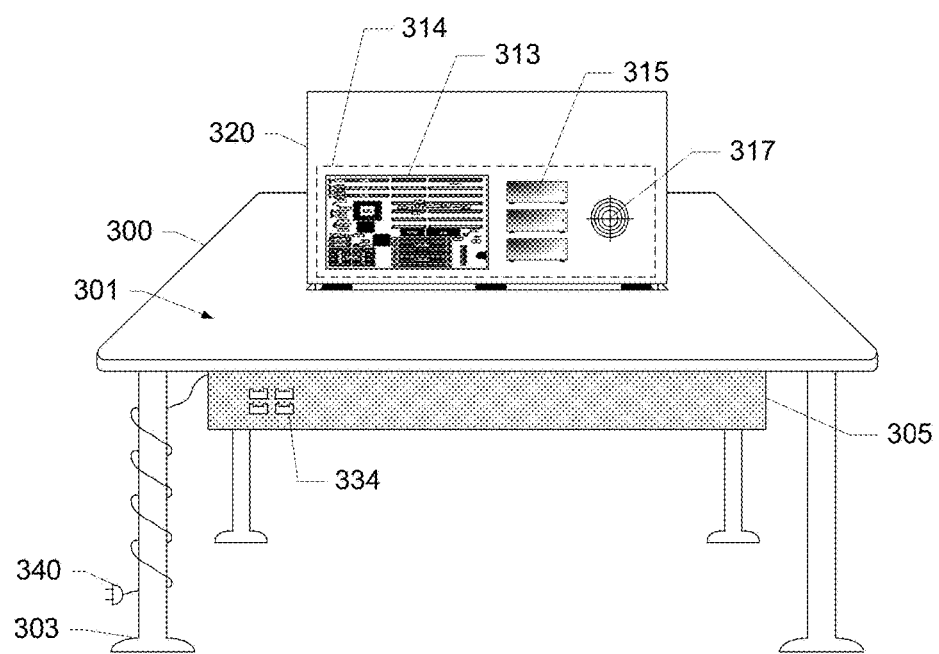
FIG. 3 shows a modular furniture system with computer components housed within a display, according to an exemplary embodiment of the present invention.

Referring now to FIG. 3, a modular furniture system is shown with computer components housed within a display 320, according to an exemplary embodiment of the present invention. Similar to the exemplary embodiments of FIGS. 1 and 2, a desk portion 300 having a top surface 301 has a storage portion 305 and is supported by legs 303. Further, a display 320 is coupled to top surface 301. However, in this exemplary embodiment, a housing 314 is included within display 320. Housing 314 includes motherboard 313, storage units 315, and a power supply 317. These components are in communication with display 320 via a computer bus (not shown). The computer bus also communicates with other components that are not shown, such as input and output devices. Further, storage portion 305 includes audio, video, and other data ports 334, such as HDMI, USB, FireWire, audio/video component, and similar interfaces to peripherals and other external electronic components. Ports 334 are in communication with motherboard 313 via a computer bus.

The modular furniture system therefore provides a simple means for separating the components of a traditionally unified computer system, and the ability to interchange and reconfigure these components for different situations. The features described in the above embodiments and in the below variations are combinable in several combinations. For instance, a power supply may be included within the storage portion while the computer components (motherboard, CPU, etc.) are stored within a display. The expansion ports may be distributed across different portions of the system, and housing may be provided for several other components such as printers, scanners, network interfaces, etc. Other combinations will be apparent to a person having ordinary skill in the art in light of this disclosure. Some of these combinations are shown below.

Figure 4:
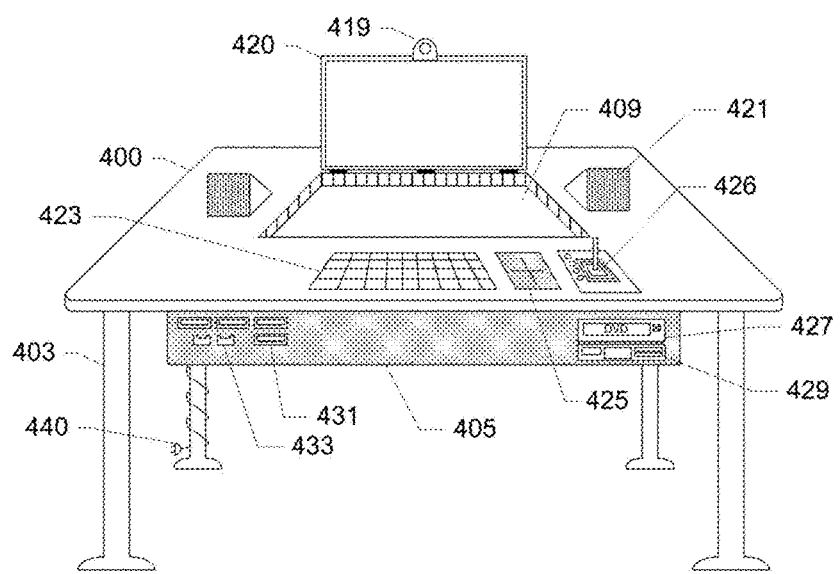
FIG. 4 shows a modular furniture system having integrated input and output devices, according to an exemplary embodiment of the present invention.

FIG. 4 shows a modular furniture system having integrated input and output devices, according to an exemplary embodiment of the present invention. In this embodiment, a desk portion 400 is coupled to leg portions 403 and a storage portion 405. Desk portion 400 is enhanced with housings for speakers 421, display 420, and a gaming or other manual controller 426. A display 420 rests on pivots and may be housed within display housing 409. Display 420 also includes a camera 419. Additionally, instead of a physical keyboard on a retractable shelf, table portion 400 includes a touch-sensitive region 423 that may be configured to form a keyboard. For instance, touch-sensitive region 423 includes pressure sensors, or a plurality of capacitors arranged to form the keys of a keyboard. Table portion 400 also includes a touch-sensitive pad 425 that may be used as a pointing device, equivalent to a mouse. Similar to other electronic components such as media drives 427 and 429, and expansion ports 431 and 433, the keyboard, mouse, speakers, and display communicate with a CPU via one or more computer buses that are not shown.

Figure 5:
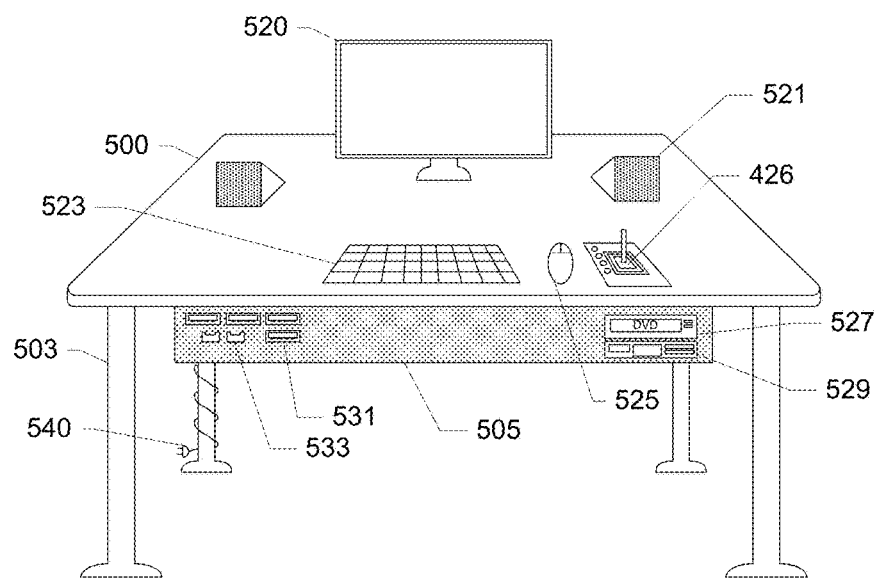
FIG. 5 shows a modular furniture system having a fixedly coupled display unit on a table portion, according to an exemplary embodiment of the present invention.

FIG. 5 shows a modular furniture system having a fixedly coupled display unit on a table portion, according to an exemplary embodiment of the present invention. Instead of being coupled to desk portion 500 via pivots, display 520 is a monitor that is coupled to top surface 501 of desk portion 500. This allows for increased flexibility in situations where multiple displays may be used, or for markets where several options for external displays exist. Further, ports 531 and 533 may include VGA, HDMI, or other video output ports enabling connections to different types of display devices such as projectors, etc. The remaining components are the same or equivalent as in the previous embodiments of FIGS. 1-4.

Figure 6:
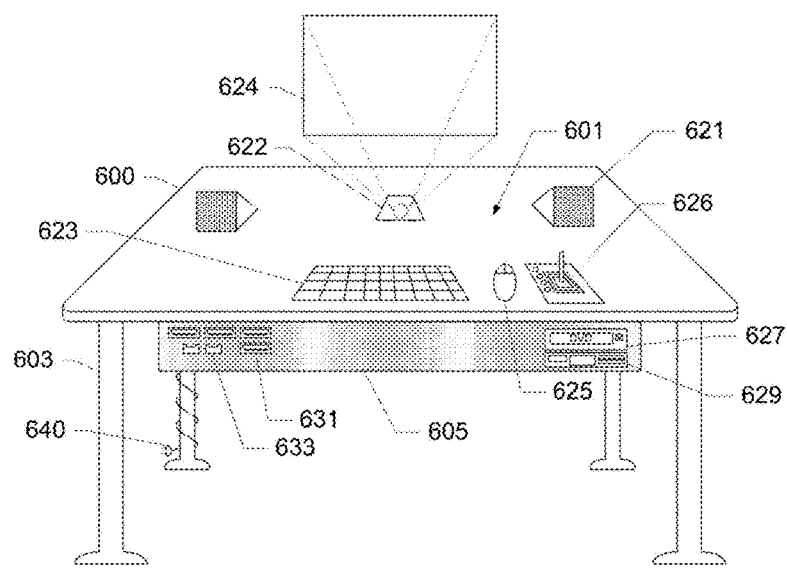
FIG. 6 shows a modular furniture system having a projection display coupled to a table portion, according to an exemplary embodiment of the present invention.

FIG. 6 shows a modular furniture system having a projection display coupled to a table portion, according to an exemplary embodiment of the present invention. Instead of being coupled to desk portion 500 via pivots, or using an external display, desk portion 600 includes a projector 622. Projector 622 can be enclosed within desk portion 600 when not in use, and is raised and can be adjusted to display an image 624 on a screen when in use. Image 624 is displayed on a wall behind desk 600, or on a screen that is coupled to and extendible from desk portion 600. This allows for increased flexibility in situations where larger displays are needed, for instance, conference tables, classrooms, labs, etc. Further, ports 631 and 633 may include VGA, HDMI, or other video output ports enabling connections to different types of display devices such as projectors, etc. The remaining components are the same or equivalent as in the previous embodiments of FIGS. 1-5.

Figure 7:
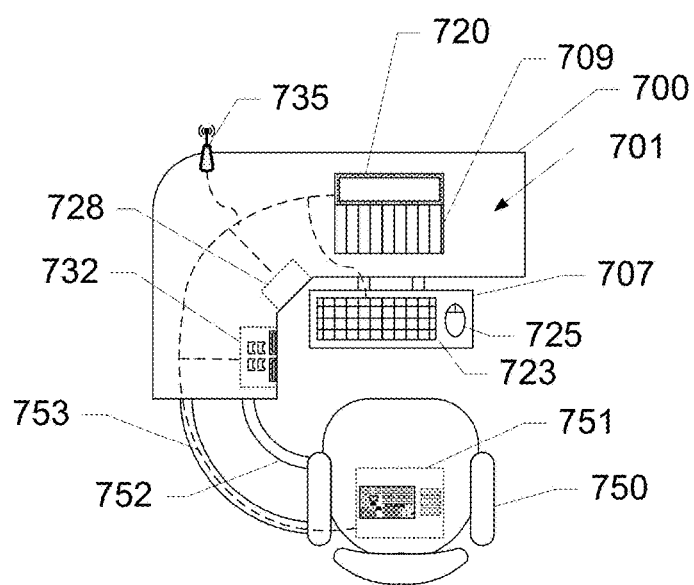
FIG. 7 shows a furniture system including a desk portion coupled to a chair portion, according to an exemplary embodiment of the present invention.

FIG. 7 shows a furniture system including a desk portion coupled to a chair portion, according to an exemplary embodiment of the present invention. Desk portion 700 includes a substantially planar portion 701, and is coupled to chair portion 750 via connecting members 752. The furniture components of this embodiment generally resemble existing classroom chair/desk combinations, except with the added electronic devices and other features. For instance, chair portion 750 includes beneath a motherboard housing 751, housing a motherboard and/or storage units. The motherboard includes at least a CPU and a memory. The memory includes logic for operating the CPU and other components. Further, a computer bus indicated by dotted line 753 traverses connecting members 752 and provides a communication link for the other electronic components of the system. Table portion 700 includes display storage 709 for display 720, a shelf 707 for keyboard 723 and mouse 725, a CD/DVD drive housing 728, and an expansion port housing 732. Further, an antenna 735 enables communication with a network or with other electronic components/peripherals. Antenna 735 is also coupled to computer bus 753. The motherboard within housing 751 may also include a network interface card (NIC) enabling communication over a network. Additionally, several combinations of the system may be connected to form a local network, wherein one modular unit is designated as a server, or as an ad-hoc network with no centralized server. Modular units within the network may communicate with each other and with a server over one or more networks via antenna 735.

Figure 8A:
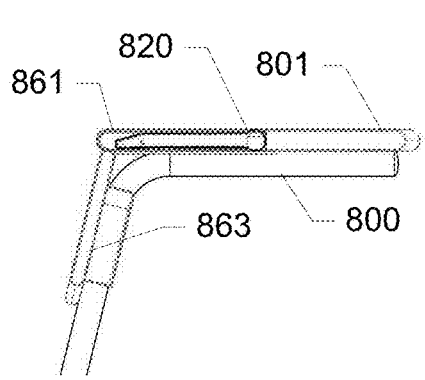
FIGS. 8A-8D show various stages of a display integrated into a table portion, according to an exemplary embodiment of the present invention.
Figure 8B:
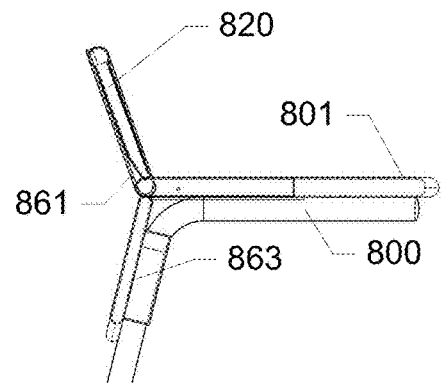
Figure 8C:
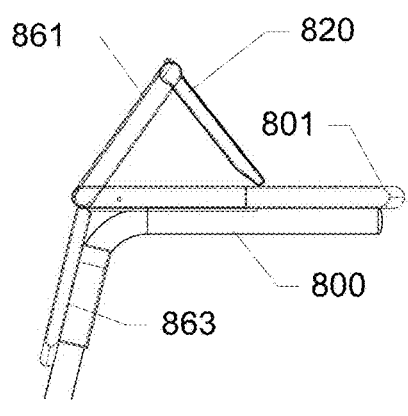
Figure 8D:
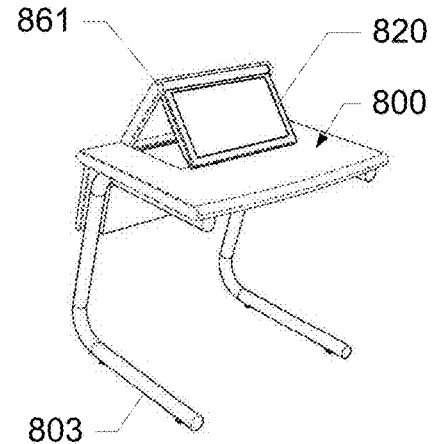

FIGS. 8A-8D show various stages of a display device 820 integrated into a desk portion 800, according to an exemplary embodiment of the present invention. In this embodiment, a desk portion 800 has a top surface 801. Top surface 801 is adapted to receive a display holder 861, enclosing a display device 820. FIG. 8A shows the display holder 861 and display device 820 in a closed position, with a top surface of display device 820 being a part of top surface 801. In FIG. 8B, display device 820 along with housing 861 is lifted off top surface 801. At this angle and distance, display device 820 is visible by a user of the system. However, the display device may be brought forward as shown in FIG. 8C. Display device 820 and housing 861 are coupled via a pivot point such that when pushed forward, housing 861 pushes display device 820 forward while retaining the original angle of display device 820. This ensures that a user will be able to view display device 820, especially in the case of LCD displays. FIG. 8D shows a perspective view of the display device 820 in a substantially unfolded position. Legs 803 support desk portion 800, and may include cross members, adapters to couple to a seat portion, as well as other electronic and furniture components that are not shown.

In all of the above embodiments, it will be observed that although the furniture components of the shell itself can have various designs and implementations, the computer components and features are substantially consistent. For instance, the motherboard housing contains a motherboard, a central processing unit (CPU) board, and may include a hard drive array for the system. The microprocessor module may interface with the other computer components via a module bay, which is a box frame that contains standard interface connectors for the computer hard drive module. These interface connectors include connectors to the various computer buses that enable communication with the several electronic components. The motherboard housing and module bay may be shock resistant and waterproof. In addition to the CPU, each computer hard drive module may be equipped with wireless and wired networking devices. The computer hard drive modules will offer the options of various software, including, for example, having Microsoft Windows, Mac, Linux, or any other operating system of choice preinstalled. There may also be an adapter for the computer hard drive module bay that converts the module bay into a docking station to substitute a laptop computer as the hard drive for the present invention and allow the laptop to interface with the other computer components integrated into the desk.

The computer screen or display can be, for example, a standard Liquid Crystal Display ("LCD") or equivalent that will be removable for easy replacement and repair. The display may be located on the top of the desk and connect to an interface that allows the display to flip up when in use and flip down into a display housing compartment when not in use. The display may be waterproof and shock resistant and when in the down position the back of the display creates a water tight seal with the surface of the desk. Further, a touchscreen display may serve as a Tablet PC when paired with appropriate software.

In other words, the uses and applications of the present invention are virtually limitless. The present invention may be used, for example, in places including but not limited to classroom settings of all levels, (primary, secondary, post-secondary), training environments, offices, cubicles, stadiums, restaurants/bars, airplanes, cruise ship cabins, coffee shops, etc. Other places for use are also possible and within the purview of one having ordinary skill in the art after consideration of the present disclosure.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A modular furniture system comprising:
a shell having a substantially planar upper surface; and
a moveable display housing set within an interior portion of the upper surface such that the display housing is surrounded on each side by a substantially equal portion of the upper surface, the display housing being adapted to receive a display, and having a pivot point at a bottom of the display, such that a back surface of the display becomes flush with the substantially planar upper surface when the display is in a closed position, and the display is positioned completely above the upper surface when the display is in an open position.

2. The system of claim 1, further comprising an input device placed within an input device housing of the shell.

3. The system in claim 2, wherein the input device is a keyboard on a keyboard shelf that retracts and extends from within the shell.

4. The system of claim 1, further comprising a computer bus integrated within the shell to transmit data to and from a plurality of electronic components.

5. The system of claim 4, further comprising a power system integrated within the shell to power the plurality of electrical components from a single power source.

6. The system of claim 5, further comprising a storage device integrated into the shell and coupled to the computer bus and the power system.

7. The system of claim 6, wherein the storage device is one or more of a hard disk drive (HDD), solid state drive (SSD), and digital video disc (DVD) drive.

8. The system of claim 5, further comprising a camera integrated into one of the shell and the display, and coupled to the computer bus and the power system.

9. The system of claim 5, further comprising a speaker integrated into one of the shell and the display, and coupled to the computer bus and the power system.

10. The system of claim 5, further comprising a plurality of electronic expansion ports integrated into the shell and coupled to the computer bus.

11. The system of claim 10, wherein the plurality of electronic expansion ports includes one or more of Universal Serial Bus (USB), FireWire, HDMI, and audio/video (AV) ports.

12. The system of claim 5, further comprising a wireless network interface coupled to the computer bus, the wireless network interface including one or more of a Wi-Fi interface, BLUETOOTH interface, and cellular interface.

13. The system of claim 1, wherein the display is one of an LCD screen, a touch screen, and a projector.

14. The system of claim 1, further comprising a chair integrated with the shell.

15. A modular furniture system, comprising:
a desk portion with a substantially planar upper surface;
a plurality of leg portions to support the desk portion;
a housing portion coupled to the desk portion; and
a moveable display housing set within an interior portion of the upper surface such that the display housing is surrounded on each side by a substantially equal portion of the upper surface, the display housing being adapted to receive a display, and having a pivot point at a bottom of the display, such that a back surface of the display becomes flush with the substantially planar upper surface when the display is in a closed position, and the display is positioned completely above the upper surface when the display is in an open position.

16. The system of claim 15, further comprising an input device housing within the desk portion to support an input device.

17. The system of claim 16, wherein the input device is a touch-sensitive portion of the upper surface.

18. The system of claim 17, wherein the touch-sensitive portion is a keyboard.

19. The system of claim 16, wherein the input device is a gaming controller.

20. A modular furniture system comprising:
a chair portion including a seat portion and a back portion;
a computer housing coupled to a bottom surface of the seat portion;
a table portion coupled to the chair portion, the table portion having a substantially planar upper surface; and
a movable display housing positioned within the table portion, the display housing being set within an interior portion of the substantially planar upper surface such that the display housing is surrounded on each side by a substantially equal portion of the upper surface and being adapted to receive a display, such that a back surface of the display becomes flush with the substantially planar upper surface when in a closed position, and the display is positioned completely above the upper surface when the display is in an open position.

* * * * *